(12) United States Patent
Millner et al.

(10) Patent No.: US 12,378,616 B2
(45) Date of Patent: Aug. 5, 2025

(54) SEALING A REDUCTION ASSEMBLY

(71) Applicant: Primetals Technologies Austria GmbH, Linz (AT)

(72) Inventors: Robert Millner, Loosdorf (AT); Johannes Rothberger, Hellmonsödt (AT); Hans Thomas Sattler, Linz (AT)

(73) Assignee: Primetals Technologies Austria GmbH, Linz (AT)

( * ) Notice: Subject to any disclaimer, the term of this patent is extended or adjusted under 35 U.S.C. 154(b) by 347 days.

(21) Appl. No.: 17/625,874

(22) PCT Filed: Jul. 3, 2020

(86) PCT No.: PCT/EP2020/068774
§ 371 (c)(1),
(2) Date: Jan. 10, 2022

(87) PCT Pub. No.: WO2021/004914
PCT Pub. Date: Jan. 14, 2021

(65) Prior Publication Data
US 2022/0259685 A1 Aug. 18, 2022

(30) Foreign Application Priority Data

Jul. 8, 2019 (EP) .................................... 19184964

(51) Int. Cl.
*C21B 13/00* (2006.01)
*F27D 7/02* (2006.01)
(Continued)

(52) U.S. Cl.
CPC ............ *C21B 13/0093* (2013.01); *F27D 7/02* (2013.01); *F27D 7/06* (2013.01); *F27D 15/00* (2013.01);
(Continued)

(58) Field of Classification Search
CPC ..... C21B 13/0093; C21B 13/02; F27D 15/00; F27D 7/06; F27D 7/02; F27D 2007/063; F27D 2019/0081; F27D 2019/0028
(Continued)

(56) References Cited

U.S. PATENT DOCUMENTS 3,850,616 A * 11/1974 Cruse, Jr. ................. C21B 13/02
266/195
3,964,898 A 6/1976 Murray et al.
(Continued)

FOREIGN PATENT DOCUMENTS

CN 106521074 B 3/2018
RU 2128712 C1 4/1999
(Continued)

OTHER PUBLICATIONS

International Search Report and Written Opinion received in International Application No. PCT/EP2020/068774 dated Jul. 20, 2020, 16 pages.
(Continued)

*Primary Examiner* — Jessee R Roe
*Assistant Examiner* — Michael Aboagye
(74) *Attorney, Agent, or Firm* — Liang & Hennessey LLP; Brian Hennessey

(57) ABSTRACT

The invention relates to a method for sealing a reduction assembly, wherein the reduction assembly has a product discharge device, wherein the product discharge device is supplied with sealing gas and wherein at least one compressor is provided for delivering prepared sealing gas to the product discharge device, wherein according to the invention, at least one nitrogen generator is provided for producing pure sealing gas, and wherein the sealing gas for supplying to the product discharge device is composed of pure sealing gas from the at least one nitrogen generator or
(Continued)

composed of pure sealing gas from the at least one nitrogen generator and of prepared sealing gas from the at least one compressor. The invention also relates to a device with which the method according to the invention is carried out.

23 Claims, 2 Drawing Sheets

(51) Int. Cl.
 *F27D 7/06* (2006.01)
 *F27D 15/00* (2006.01)
 *F27D 19/00* (2006.01)

(52) U.S. Cl.
 CPC .................. *F27D 2007/063* (2013.01); *F27D 2019/0028* (2013.01); *F27D 2019/0081* (2013.01)

(58) Field of Classification Search
 USPC .......... 266/144, 156, 195, 197, 179, 154, 44
 See application file for complete search history.

(56) References Cited

U.S. PATENT DOCUMENTS

| | | | |
|---|---|---|---|
| 4,188,022 A | 2/1980 | Beggs et al. | |
| 5,989,309 A | 11/1999 | Joo et al. | |
| 6,210,631 B1* | 4/2001 | Rosenfellner | C21B 13/02 266/144 |
| 6,214,082 B1 | 4/2001 | Rosenfellner et al. | |
| 6,352,573 B2 | 3/2002 | Mcclelland et al. | |
| 7,938,882 B2 | 5/2011 | Metius et al. | |
| 9,169,535 B2* | 10/2015 | Millner | C21B 13/0073 |
| 2001/0011787 A1 | 8/2001 | Rosenfellner et al. | |
| 2003/0041628 A1* | 3/2003 | Bird | C03B 37/029 65/533 |

FOREIGN PATENT DOCUMENTS

| | | |
|---|---|---|
| RU | 2136763 C1 | 9/1999 |
| SU | 639485 A3 | 12/1978 |
| WO | 2008123962 A1 | 10/2008 |
| WO | 2017047314 A1 | 3/2017 |

OTHER PUBLICATIONS

European Search Report received in European Application No. 19184964.5 dated Nov. 19, 2019, 8 pages.
Russian Search Report received in Russian Application No. 2022100037/05(000064) dated Sep. 27, 2023, 4 pages.
Russian Office Action received in Russian Application No. 2022100037/05(000064) dated Sep. 27, 2023, 18 pages.

* cited by examiner

SEALING A REDUCTION ASSEMBLY

CROSS-REFERENCE TO RELATED APPLICATIONS

The present application is a national phase application of PCT Application No. PCT/EP2020/068774, filed Jul. 3, 2020, entitled "SEALING A REDUCTION ASSEMBLY", which claims the benefit of European Patent Application No. 19184964.5, filed Jul. 8, 2019, each of which is incorporated by reference in its entirety.

BACKGROUND OF THE INVENTION

1. Field of the Invention

The invention relates to a method for sealing a reduction apparatus, where the reduction apparatus comprises a product discharge device, where the product discharge device is supplied with barrier gas and at least one compressor is provided for supplying treated barrier gas to the product discharge device, and also an apparatus for sealing a reduction apparatus.

2. Description of the Related Art

In order to obtain metals from metal ores, it is necessary to decrease the proportion of oxygen in the ores. One method for decreasing the proportion of oxygen is direct reduction, in which a reduction gas is allowed to act on the solid metal ore in a reduction apparatus. The solid product of the direct reduction is discharged from the reduction apparatus and can be processed further in various ways—for example, it is often compacted hot, for example briquetted, in order to make it easier to handle and to minimize its specific surface area so that the occurrence of reoxidation, for example by reaction with atmospheric oxygen or $H_2O$, for example as water vapor, is inhibited. However, further processing without compaction in other apparatuses is also known. The reduction apparatus in which the direct reduction proceeds is often a reduction shaft.

It is in principle advantageous to protect the product against reoxidation by handling it under a gas which is relatively inert in respect of oxidation between discharge from the reduction apparatus and subsequent apparatuses, for example ones in which briquetting occurs.

Particularly when the reduction gas is under super atmospheric pressure in the reduction apparatus, it has to be ensured that escape of the, generally hot, reduction gas is avoided while the product is taken out. This is achieved, for example, by a barrier gas, also referred to as seal gas, being introduced into the device via which the product is discharged from the reduction apparatus, hereinafter also referred to as product discharge device. The seal gas is relatively inert or inert in respect of reaction with the product and is under a pressure which is somewhat above the pressure of the reduction gas in order to virtually form a barrier to escape of the reduction gas.

In the case of iron ores, the product of the direct reduction is, for example, referred to as direct reduced iron DRI or HDRI hot direct reduced iron, or sponge iron.

To effect sealing, i.e. to prevent exit of hot reduction gas from the reduction shaft, relatively inert barrier gas, also often referred to as bottom seal gas (BSG) since it is intended to form a seal at the lower end of the reduction shaft, is used. This is disclosed, for example, in the publications WO2008123962A1 and U.S. Pat. No. 4,188,022A. Reference is made to the product discharge device being supplied or flushed with the barrier gas. In a direct reduction plant, dried flue gas from a reformer of a direct reduction plant, which contains largely nitrogen and carbon dioxide but also relatively small proportions of $H_2O$ and oxygen and is accordingly relatively inert in respect of oxidation of HDRI, is often used as barrier gas. Nevertheless, reoxidation of the hot metal, in particular iron, by the carbon dioxide present, the water vapor and the residual oxygen does occur. This effect decreases the carbon content and the metallization and gaseous emissions arise.

In direct reduction plants of the prior art, the lower end of the reduction shaft, frequently also referred to as bottom seal leg, of the HDRI material discharge system is supplied with dried barrier gas.

Due to the fact that reoxidation of the hot iron can occur when using barrier gas containing, for instance, carbon dioxide and water vapor and residual oxygen, it is quite normal in the prior art to use large nitrogen generators based on cryogenic air fractionation in order to be able to produce technical-grade nitrogen or another relatively inert or inert gas in order to supply the reduction shaft. However, the installation of, for example, a cryogenic air fractionation plant or else a large nitrogen generator based on PSA or membrane technology in order to produce nitrogen from air leads to high capital costs.

SUMMARY OF THE INVENTION

It is an object of the invention to provide a method and an apparatus for sealing a reduction apparatus while limiting the production of nitrogen to a very low capacity.

The object of the invention is achieved by a method for sealing a reduction apparatus, where the reduction apparatus comprises a product discharge device, where the product discharge device is supplied with barrier gas and at least one compressor is provided for supplying treated barrier gas to the product discharge device, wherein, according to the invention, at least one nitrogen generator is provided for producing pure barrier gas, where the barrier gas for supply to the product discharge device is composed of pure barrier gas from the at least one nitrogen generator or of pure barrier gas from the at least one nitrogen generator and of treated barrier gas from the at least one compressor.

The reduction apparatus in which the direct reduction proceeds is often a reduction shaft. However, other suitable devices can be used as reduction apparatus for the purposes of the present invention.

A product discharge device according to the invention makes it possible to remove the reduced material from the reduction apparatus after the reduction process taking place there, in order for the reduced material to be able to be passed to further processing or a further use. A product discharge device as per the present invention is preferably a bottom seal leg of a direct reduction plant.

The bottom seal leg serves essentially as dynamic seal for the reduction apparatus. The function of the bottom seal leg is to keep the process gases in the reduction apparatus and thus prevent breakthrough of the closed reduction cycle of the process gases. The sealing of the reduction apparatus prevents the process gases from escaping, while the entry of air or oxygen is hindered and the oxidation of the metallized material is thus prevented. For this purpose, a small part of the barrier gas flows upward into the reduction apparatus in order to seal the product discharge device at the top and the remainder of the barrier gas flows together with the metal out of the product discharge device.

The apparatus of the invention for carrying out the method of the invention can also comprise more than one product discharge device.

For the purposes of the present invention, "metallized material or metal" is any metal which can be produced from metal oxide by means of a reduction reaction, but in particular iron.

According to the invention, barrier gas is used for supplying the product discharge device. For the purposes of the present invention, "barrier gas" can be either pure barrier gas or a mixture of pure barrier gas and treated barrier gas.

As pure barrier gas, preference is given according to the invention to technical-grade nitrogen or a nitrogen/argon mixture. Technical-grade nitrogen or a nitrogen/argon mixture may also contain impurities in small amounts of up to 4%, for example 1% of oxygen or other impurities.

However, not only pure nitrogen but in principle also any relatively inert or inert gas which is suitable for use in the present invention can be employed as barrier gas for the purposes of the present invention.

For the purposes of the present invention, "treated barrier gas" can be, in particular, treated flue gas from a reformer or a reduction gas oven. This treated flue gas comprises largely nitrogen and carbon dioxide and small proportions of H2O and oxygen. Of course, it is also possible for the treated barrier gas according to the invention to comprise further impurities or have a composition different from that indicated above or not to be flue gas from the reformer but be procured from another source.

According to the invention, at least one compressor is provided for supplying treated barrier gas to the product discharge device; any suitable compressor known from the prior art in connection with the present invention is possible here. The at least one compressor makes it possible to supply not only the pure barrier gas in the sense of the present invention but also treated barrier gas from the reformer or reduction gas oven to the product discharge device, with the treated barrier gas firstly being compressed in at least one compressor and if necessary being circulated in the region of the at least one compressor and only supplied when needed to the product discharge device.

A reformer or a reduction gas oven in the sense of the present invention is an apparatus for producing barrier gas by catalytic reforming of gaseous hydrocarbons, as is adequately known in the prior art. The reformer or reduction gas oven serves to produce treated barrier gas which can be used for supplying the product discharge device and is compressed in a compressor according to the invention.

The present invention can also encompass more than one compressor, for example a plurality of compressors connected in series.

In order to be able to produce pure barrier gas in the sense of the present invention from air, at least one nitrogen generator is also provided according to the invention. The at least one nitrogen generator according to the invention can be any nitrogen generator known from the prior art which is suitable for use in the method of the invention. However, preference is given to nitrogen generators based on the pressure swing adsorption technology (PSA) which is adequately known to a person skilled in the art or membrane technology.

The present invention can also have more than one nitrogen generator, for example a plurality of nitrogen generators connected in parallel.

The at least one nitrogen generator according to the present invention, in particular when using a PSA plant, requires a certain counterpressure in order to be able to function, and this also makes it possible to regulate the function of the method or the apparatus.

For this reason, there is, viewed in the direction of the flow of the pure barrier gas, at least one pressure regulating valve located at the at least one nitrogen generator or close to the nitrogen generator in order to prevent a pressure drop occurring in the at least one nitrogen generator, which could cause damage to the at least one nitrogen generator.

Since pure nitrogen for supplying the product discharge device under all possible operating conditions through to covering short-term peak demand is very expensive, the invention provides for the product discharge device to be able to be supplied not only with pure barrier gas but also with a mixture of pure barrier gas from the at least one nitrogen generator and treated barrier gas from the at least one compressor. This makes it possible to save costs which would be necessary in order to use at least one nitrogen generator having a capacity to supply amounts which would be required in times of peak demand. In times of peak demand, the consumption can increase to twice the amount.

As mentioned above, a relatively inert gas or gas mixture is particularly used as barrier gas. Just as entry of air or oxygen into the reduction apparatus is to be prevented by the barrier gas, the use of a very inert barrier gas is intended to prevent reoxidation of the hot metal, since reoxidation which would then reduce the carbon content and/or the degree of metallization of the metal also occurs on contact of carbon dioxide and water, in particular as water vapor, with the hot metal which has a temperature of about 500-750° C. The treated barrier gas, which is usually derived from flue gas from a reformer or the reduction gas oven, comprises largely carbon dioxide together with water vapor and residual oxygen. If only the treated barrier gas is used for supplying the product discharge device, a certain degree of reoxidation of the metal naturally occurs. However, technical-grade nitrogen as per the present invention leads to no reoxidation on contact with the hot iron, as a result of which the carbon content and/or degree of metallization of the iron is largely maintained. In order to ensure continual supply of pure barrier gas for all possible operating conditions, at least one nitrogen generator having a much greater capacity than is required in normal operation is necessary, since in the case of the apparatuses known from the prior art only methods and apparatuses in which pure barrier gas is used for supplying the product discharge device are known. The costs for the at least one nitrogen generator having a greater capacity for producing and thus supplying technical-grade nitrogen as pure barrier gas are naturally much higher than for a generator having a lower capacity.

The present invention now allows a dynamic combination of pure barrier gas with treated barrier gas by making it possible to use not only pure barrier gas alone, and in principle also treated barrier gas alone, but also a mixture of pure and treated barrier gas as barrier gas in order to keep the costs as low as possible.

In order to prevent reoxidation of the metal, in particular iron, as efficiently as possible, one embodiment of the invention provides for the pure barrier gas to consist of technical-grade nitrogen or of a nitrogen/argon mixture. The nitrogen here is in each case obtained from the at least one nitrogen generator.

In order to keep the costs for the relatively inert barrier gas as low as possible, an embodiment of the invention provides for the treated barrier gas from the at least one compressor to comprise carbon dioxide, water vapor, nitrogen and residual oxygen, and to be, in particular, flue gas which has been produced by means of a reformer or a reduction gas oven.

In order to ensure that the use of treated barrier gas which also contains carbon dioxide, water vapor and residual oxygen does not lead to reoxidation and thus to a reduction in the degree of metallization of the metal oxide which has previously been reduced to metal, an embodiment of the invention provides for the barrier gas to additionally comprise treated barrier gas from the at least one compressor only when the amount of pure barrier gas to be supplied increases above a maximum capacity of the at least one nitrogen generator. This also applies to an apparatus according to the invention in which the above method is carried out using a regulating device. When the amount of pure barrier gas supplied increases to above a previously prescribed maximum capacity of the at least one nitrogen generator, treated barrier gas from the at least one compressor is added to a pure barrier gas and the barrier gas to be supplied to the product discharge device is formed in this way—the product discharge device is then supplied with the mixture of the two gases formed on combination thereof.

The regulating device can be any suitable device which makes it possible to carry out the method of the invention. The regulating device can contain measuring devices, e.g. for pressure or flow, also shutoff devices such as valves, devices for data transmission, by means of which measured values from the measuring devices can be read and passed on, and a unit, e.g. a computer, which links measured values to one another, employs prescribed regulating procedures and sends setting commands to the shutoff devices.

It is of course possible to carry out the method of the invention under computer control, but the performance of the process of the invention is not restricted to a computer-controlled procedure; instead, an impulse control or the like is, for example, also possible for controlling the method of the invention.

In other words, this means that the product discharge device is nevertheless primarily supplied only with pure barrier gas and only when the amount of pure barrier gas supplied increases above a previously prescribed maximum capacity of the at least one nitrogen generator is treated barrier gas additionally employed for supplying the product discharge device. When the amount of pure barrier gas supplied increases above a previously prescribed maximum capacity of the at least one nitrogen generator, treated barrier gas from the at least one compressor is added to the pure barrier gas and the barrier gas for supplying the product discharge device is formed thereby—the product discharge device is then supplied with the mixture of the two gases formed by combination. An advantage of the present invention is also that even when, as used for a long time in the prior art, treated barrier gas is used, this is diluted with pure barrier gas, as a result of which the percentage of carbon dioxide and water vapor present is diluted further so that possible reoxidation of the metal is decreased.

In general, at least one nitrogen generator which has a particular maximum capacity and produces pure barrier gas for supplying the product discharge device is integrated into the apparatus. In the apparatuses known from the prior art, it is necessary to match the maximum capacity for supplying pure barrier gas to the peaks in the consumption of pure barrier gas. A disadvantage here is that the peak consumptions are the exception rather than the rule, as a result of which it is necessary to install at least one nitrogen generator having a far higher capacity, with the higher capacity actually being necessary only in exceptional cases.

In general, however, a relatively constant amount of pure barrier gas is required for supplying the product discharge device in normal operation and only in cases of peak consumption, for instance when there is a buildup of material in the product discharge device are larger amounts of barrier gas, for example technical-grade nitrogen, required. Such a nitrogen generator is naturally associated with higher capital costs.

To keep the amount of treated barrier gas used as low as possible, an embodiment of the invention provides for a first supply conduit to the product discharge device comprising a first regulating valve, a second supply conduit to the first supply conduit comprising a second regulating valve and a measuring device, in particular a first measuring device in the first supply conduit and/or a second measuring device in the second supply conduit, to be provided, where the pressure is measured and an increase in the amount of pure barrier gas supplied to above the maximum capacity of the at least one nitrogen generator leads to a pressure drop in the first supply conduit and/or the second supply conduit, as a result of which the first regulating valve in the first supply conduit opens in order to supply additional treated barrier gas from the at least one compressor to the product discharge device. As soon as the demand goes back into the region of the maximum capacity or below, the first regulating valve closes again, either completely or partially. This of course also applies to an apparatus according to the invention, with the procedure indicated above being carried out by means of the regulating device.

The present invention encompasses a first supply conduit which makes it possible to supply both treated and pure barrier gas to the product discharge device. It is also possible for the apparatus of the invention to comprise more than one first supply conduit.

The regulating valves according to the invention can be any suitable regulating valves known from the prior art, but in particular flap valves.

In principle, a third regulating valve can also be provided in the first supply conduit upstream, viewed in the flow direction, of the first regulating valve and closer to the at least one compressor (i.e. upstream of the opening on the second supply conduit into the first supply conduit), but this is not absolutely necessary for regulating the supply of barrier gas to the product device. When a third regulating valve is present, it of course always also opens when the first regulating valve is open in order to allow treated barrier gas to be supplied to the product discharge device, or the third regulating valve can always be kept open. The third regulating valve downstream of the at least one compressor is in the case of existing compressors usually normally provided for regulating the addition of treated barrier gas from the compressor.

Due to the amount of treated barrier gas supplied being restricted to cases of peak consumption and the treated barrier gas being diluted further with the pure barrier gas, the reoxidation of the metal generally remains very low since the normal consumption can be covered by pure barrier gas.

In one embodiment, a measuring device is provided in the first supply conduit so as to make it possible to measure a change in the pressure, in particular a pressure drop, in the first supply conduit, by which means a necessary increase in the amount supplied to above the maximum capacity of the at least one nitrogen generator can be detected. The measured pressure change brings about opening of the first regulating valve in the first supply conduit, as a result of which treated barrier gas from the at least one compressor is supplied to the product discharge device. Nevertheless, pure nitrogen continues to be supplied with maximum capacity of the at least one nitrogen generator, so that the reoxidation can be kept very low even when treated nitrogen is supplied, since the treated barrier gas mixes with the pure barrier gas.

In an embodiment of the invention, a first supply conduit to the product discharge device comprising a first regulating valve, a second supply conduit to the first supply conduit comprising a second regulating valve and a measuring device, in particular a first measuring device in the first supply conduit and/or a second measuring device in the second supply conduit, are provided, where the flow rate is measured and an increase in the amount of pure barrier gas supplied to above the maximum capacity of the at least one nitrogen generator leads to an increasing flow rate in the first supply conduit and/or the second supply conduit, as a result of which the first regulating valve in the first supply conduit opens in order to supply additional treated barrier gas from the at least one compressor to the product discharge device so as to keep the amount of treated barrier gas used as small as possible.

The maximum flow rate is limited by a second regulating valve in the second supply conduit. The measured pressure drop or the measured increase in the flow rate brings about opening of the first regulating valve in the first supply conduit, as a result of which treated barrier gas from the at least one compressor is supplied to the product discharge device. Pure barrier gas nevertheless continues to be supplied at the maximum capacity of the at least one nitrogen generator, so that even when treated barrier gas is supplied, the reoxidation can be kept very low since the treated barrier gas mixes with the pure barrier gas. As soon as the demand goes back into the region of the maximum capacity or below, the first regulating valve closes again, either completely or partially. This of course also applies to an apparatus according to the invention, with the procedure indicated above being carried out by means of the regulating device.

In a preferred embodiment of the invention, the at least one compressor comprises a bypass conduit and also a third measuring device, preferably for measuring the pressure or the flow rate, and the first regulating valve of the first supply conduit opens when the third measuring device determines that a large part of the treated barrier gas, preferably the entire treated barrier gas, downstream of the at least one compressor is being recirculated via the bypass conduit to the suction side of the at least one compressor, as a result of which no more gas is taken off from the reformer or the reduction gas oven in order to supply the bottom seal gas consumer. As soon as the major part of or the entire barrier gas downstream of the at least one compressor is no longer recirculated via the bypass conduit into the at least one compressor, the first regulating valve and optionally the third regulating valve close(s) again, either completely or partially. This of course also applies to an apparatus according to the invention, with the procedure indicated above being carried out by means of the regulating device.

It is also possible for more than one bypass conduit to be provided on the at least one compressor.

When a bypass conduit is provided, a fourth regulating valve which closes when the first and the second regulating valves open, so that treated barrier gas is supplied to the product discharge device, can also be provided in the bypass conduit. This fourth regulating valve ensures that the exit pressure downstream of the at least one compressor is kept constant and at least part of the treated barrier gas is circulated while the first and second regulating valves are open. As soon as the first regulating valve is closed again (because, for example, the second regulating valve opens again because of a reduction in the amount of gas required), the fourth regulating valve opens again so that the treated barrier gas is once again recirculated from the pressure side to the suction side of the at least one compressor.

A third measuring device which measures the pressure or the flow rate in the first supply conduit is preferably provided downstream of the at least one compressor. When a change in the pressure or the flow rate then occurs, so that the treated barrier gas is recirculated in its entirety via the bypass conduit back to the suction side of the at least one compressor, the third regulating valve opens so that the gas is conveyed via the first supply conduit on to the product discharge device. As soon as the pressure or the flow rate measured by the third measuring device changes again, the first and/or third regulating valve closes again and the product discharge device is once again supplied with pure barrier gas.

It is possible for the apparatus to comprise further measuring devices for measuring pressure and/or flow and/or for further regulating valves to be provided in the apparatus.

In an embodiment of the invention, the at least one nitrogen generator comprises a second regulating valve, where the second regulating valve continues to keep the amount of pure barrier gas supplied constant at the maximum capacity of the at least one nitrogen generator when the first regulating valve in the first supply conduit is opened, so as to prevent the at least one nitrogen generator being damaged by the increased amount required as a result of hydraulic overloading. This of course also applies to an apparatus according to the invention, with the procedure indicated above being carried out by means of the regulating device.

A second measuring device which measures the flow rate in the second supply conduit downstream of the nitrogen generator is preferably additionally provided on the second regulating valve. When the second measuring device registers an increase in the flow rate, the second regulating valve closes further in order to prevent the amount of pure barrier gas supplied from going above the maximum capacity of the at least one nitrogen generator, in order to prevent damage to the at least one nitrogen generator. As soon as the demand goes back into the region of the maximum capacity or below, the second regulating valve opens again, either completely or partially.

Furthermore, in a preferred embodiment of the invention, the reduction apparatus is a direct reduction plant for the direct reduction of metal oxide-containing, preferably iron oxide-containing, starting materials to metallized material by contact with a hot reduction gas in order to be able to provide a very economically and ecologically advantageous process. This of course also applies to an apparatus according to the invention.

The use of other suitable methods is of course not ruled out thereby.

The method is preferably employed in connection with the direct reduction of iron oxide-containing starting materials. However, this does not rule out use with other metal oxide-containing or other reactive starting materials.

Possible hot reduction gases for the purposes of the present invention are all suitable gases which generally contain predominantly H2 and CO and also H2O, CO2, CH4 and N2.

The above mentioned object is also achieved by an apparatus according to the invention for sealing a reduction apparatus. The reduction apparatus comprises a product discharge device, where at least one compressor for supplying treated barrier gas to the product discharge device via a first supply conduit, with the first supply conduit to the product discharge device comprising a first regulating valve, is additionally provided. According to the invention, the apparatus further comprises at least one nitrogen generator for producing pure barrier gas, with the at least one nitrogen generator further comprising a second supply conduit to the first supply conduit, and the second supply conduit for supplying barrier gas to the product discharge device. The apparatus further comprising a regulating device which is configured for regulating a first regulating valve of the first supply conduit and a second regulating valve of the second supply conduit in such a way that the barrier gas for supplying the product discharge device is composed of pure barrier gas from the at least one nitrogen generator or of pure barrier gas from the at least one nitrogen generator and of treated barrier gas from the at least one compressor, in order to be able to carry out the method of the invention. As a result of which costs are saved in comparison with a nitrogen generator having a higher design capacity and low production costs for pure barrier gas are achieved.

The regulating device is preferably configured so that when the amount of pure barrier gas supplied rises above a previously prescribed maximum capacity of the at least one nitrogen generator, treated barrier gas from the at least one compressor is added to pure barrier gas and the barrier gas for supplying the product discharge device is formed thereby. The regulating device is thus configured so that the barrier gas additionally comprises treated barrier gas from the at least one compressor only when the maximum capacity of the at least one nitrogen generator is exceeded.

The present invention encompasses a second supply conduit which makes it possible to supply pure barrier gas to the first supply conduit, with the second supply conduit opening into the first supply conduit.

The present invention may encompass more than one second supply conduit.

Since the method of the invention can also be carried out with the assistance of a computer, the invention further provides a computer program product which when loaded and executed on a computer of a regulating device effects a method corresponding to the method of the invention. The computer of the regulating device brings about a mode of operation of the regulating device which is such that barrier gas for supply to the product discharge device is either composed of pure barrier gas from the at least one nitrogen generator or of pure barrier gas from the at least one nitrogen generator and of treated barrier gas from the at least one compressor. The computer receives the measured data from measuring devices, e.g. for pressure or flow, and on the basis of regulating procedures, which are set forth in the dependent method claims, sends appropriate setting commands to shut off devices such as valves. In particular, the computer sends setting commands to the first regulating valve of the first supply conduit and to the second regulating valve of the second supply conduit.

The computer program product can, for example, be a memory in which an appropriate computer program has been stored or can be a signal or data stream which can be loaded via a data connection into the processor of a regulating device.

BRIEF DESCRIPTION OF THE DRAWINGS

The invention will now be illustrated with the aid of a number of working examples. The drawings are illustrative and although they are intended to disclose the inventive concept, they do not in any way narrow or delimit the latter.

The Drawings Show.

DETAILED DESCRIPTION

Figure 1:
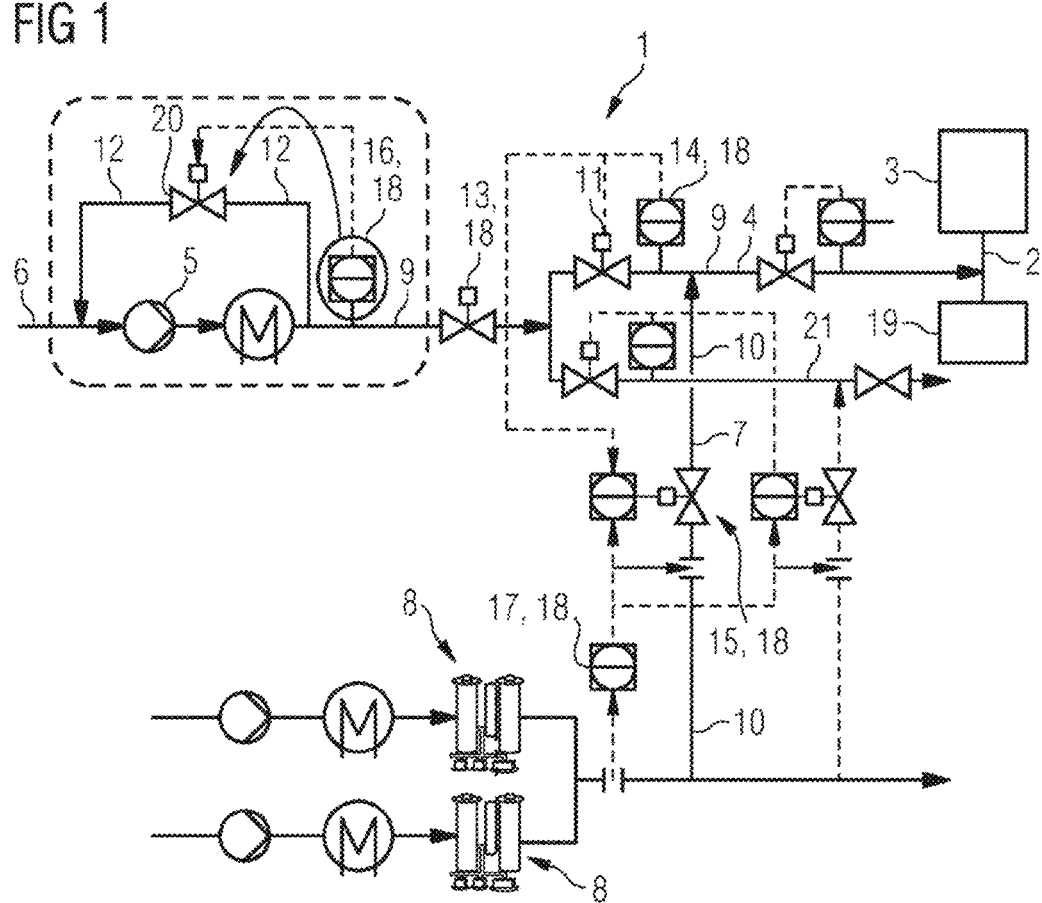
FIG. 1 a schematic depiction of a variant of the method of the invention

FIG. 1 schematically shows an apparatus 1 according to the invention for carrying out a method according to the invention. The apparatus 1 for sealing a reduction apparatus comprises a reduction apparatus 3 having a product discharge device 2. To supply barrier gas 4, a first supply conduit 9 leads from a compressor 5 to the product discharge device 2. The metallized material goes from the product discharge device 2 into the product discharge chamber 19 and from there is passed to further processing or a further use. To supply pure barrier gas, a second supply conduit 10 leads from a nitrogen generator 8 to the first supply conduit 9.

The first supply conduit 9 comprises a first regulating valve 11 and also a first measuring device 14. The second supply conduit comprises a second measuring device 17. Viewed in the direction of flow of the treated barrier gas 6, the second supply conduit 10 opens into the first supply conduit 9 downstream of the first regulating valve 11.

The compressor 5 further comprises a bypass conduit 12, so that the treated barrier gas 6 downstream of the compressor 5 can be recirculated from the pressure side back to the suction side of the compressor 5.

The first supply conduit 9 further comprises a third regulating valve 13 which is positioned downstream of the third measuring device 16. This third regulating valve 13 does not necessarily have to be present.

The apparatus further comprises a second regulating valve 15 and also a second measuring device 17 which measures the pressure or the flow rate and controls by means of the second regulating valve 15, with the second measuring device 17 and the second regulating valve being positioned in the second supply conduit 10.

In the present example, the nitrogen generator 8 has a maximum capacity of 3100 standard $m^3/h$. As long as the capacity for supply of pure barrier gas 7 remains below the maximum capacity of the nitrogen generator 8, pure barrier gas 7 from the nitrogen generator 8 is introduced via the second supply conduit 10 into the first supply conduit 9 and conveyed via the first supply conduit 9 on to the product discharge device 2 for use. In this case, the regulating valve 11 remains completely or largely closed and the product discharge device 2 is supplied only with pure barrier gas 7. However, if the demand for barrier gas 4 increases to above the maximum capacity of the nitrogen generator 8, the first regulating valve 11 opens, either completely or partially, so that the product discharge device 2 is supplied with not only pure barrier gas 7 from the nitrogen generator 8 via the second supply conduit 10 but also with treated barrier gas 6 from the compressor 5 via the first supply conduit 9. As soon as the demand goes back into the region of the maximum capacity or below, the second regulating valve 15 partially closes again. In the present example, the nitrogen generator 8 is a PSA plant, the function of which is based on a certain counterpressure for setting the adsorption pressure.

Figure 3:
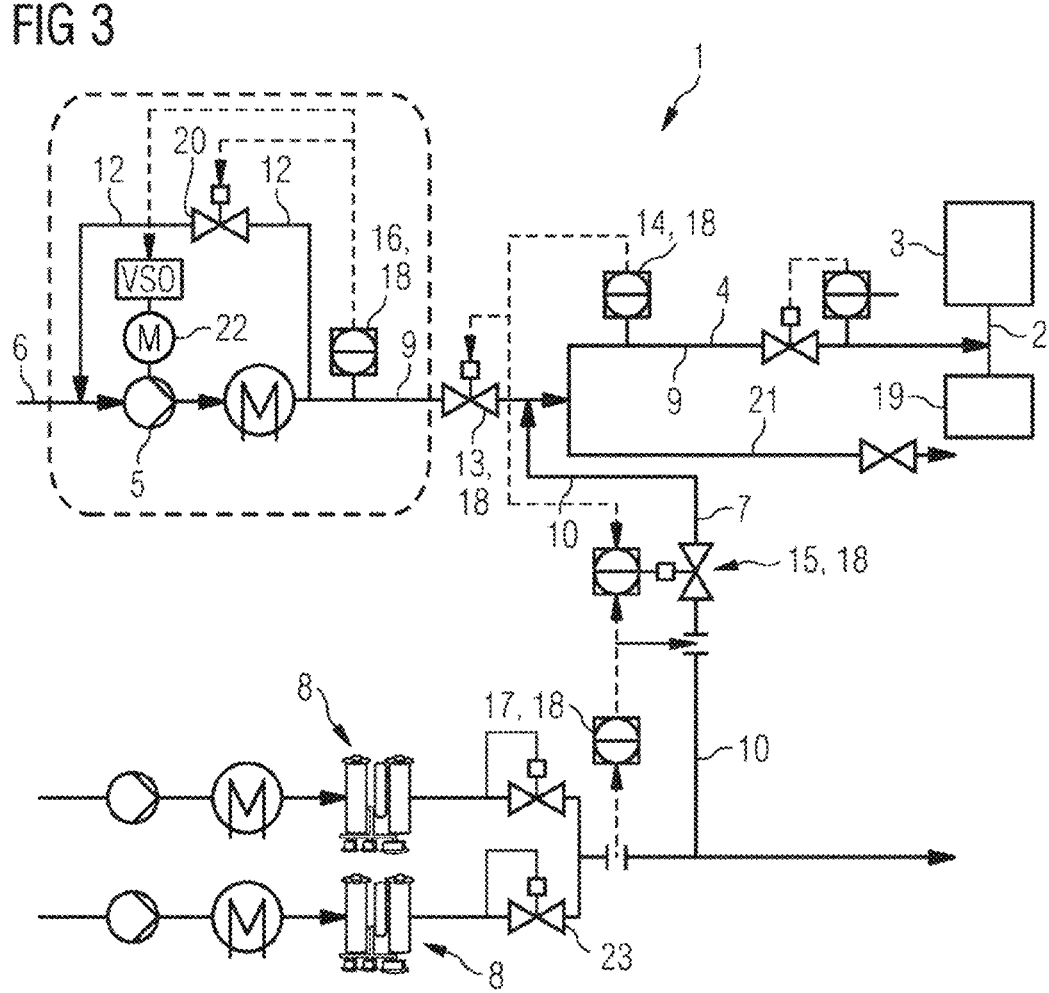

Viewed in the flow direction of the pure barrier gas 7, the second supply conduit 10 can have a pressure maintenance valve 23 arranged on the nitrogen generator 8 or close to the nitrogen generator 8, see FIG. 3. The pressure maintenance valve 23 keeps the pressure constant at a previously prescribed pressure, for example 7 bar, in order to prevent damage to the nitrogen generator 8 due to the presence of a pressure which is too low.

The first measuring device 14 measures the pressure or the flow rate in the first supply conduit 9, as soon as a change or a decrease in the pressure or an increase in the flow rate, which is associated with the maximum capacity of the nitrogen generator 8 being exceeded, is registered, the first regulating valve 11 opens so that treated barrier gas 6 can be supplied from the compressor 5 via the first supply conduit 9 to the product discharge device 2. Nevertheless, pure barrier gas 7 continues to be supplied with the maximum capacity in this case, and then mixes with treated barrier gas 6 in the first supply conduit 9. In principle, treated barrier gas 6 is therefore never supplied alone to the product discharge device 2, although this would naturally also be possible. As soon as the demand goes back into the region of the maximum capacity or below, the first regulating valve 11 closes again, either completely or partially.

If the pressure in the first supply conduit 9 is about 3 bar in times of normal consumption and the first measuring device 14 measures a pressure decrease to, for example, 2.9 bar, the first regulating valve 11 is opened in order to be able to supply treated barrier gas 6 from the compressor 5 to the product discharge device 2. As soon as the demand goes back into the region of the maximum capacity or below, the first regulating valve 11 closes again, either completely or partially.

The second measuring device 17 measures the flow rate in the second supply conduit 10. As soon as the second measuring device 17 detects an increase in the flow rate to above the maximum capacity of the nitrogen generator 8, the second regulating valve 15 partially closes or does not open further, so that only pure barrier gas is supplied at maximum capacity, but not above the maximum capacity, to the first supply conduit 9. As a result of the second regulating valve 15 not closing completely, the product discharge device 2 is never supplied entirely with treated barrier gas 6.

The compressor 5 also has, apart from a downstream cooler, a bypass conduit 12, so that the treated barrier gas 6, which is supplied from the reformer (not depicted), is recirculated from the pressure side of the compressor 5 via the bypass conduit 12 back to the suction side of the compressor 5.

If the treated barrier gas 6 is recirculated in its entirety via the bypass conduit 12 back to the suction side of the compressor 5 and there is therefore no capacity for taking up further treated barrier gas 6, the third measuring device 16 detects an associated change or decrease in the pressure or an increase in the flow, so that the third regulating valve 13 and the first regulating valve 11 open in order to supply treated barrier gas 6 to the product discharge device 2. In this case, too, the treated barrier gas 6 is mixed with the pure barrier gas 7 in the first supply conduit 9, so that in principle treated barrier gas 6 is never supplied alone to the product discharge device 2.

The bypass 12 comprises a fourth regulating valve 20 which closes when the third regulating valve 13 and the first regulating valve 11 open in order to supply treated barrier gas 6 to the product discharge device 2, which prevents the gas or part thereof from continuing to be circulated. As soon as the first regulating valve 11 and the second regulating valve 13 close again, the fourth regulating valve 20 opens again so that the treated barrier gas 6 is recirculated from the pressure side of the compressor 5 back to the suction side of the compressor 5.

As an alternative, the compressor 5 can also comprise a frequency converter 22, as depicted in FIG. 3, instead of or in addition to the fourth regulating valve 20. When the third measuring device 16 detects a change, i.e. an increase in the flow rate or a decrease in the pressure, the speed of rotation of the compressor 5 is reduced. As soon as the flow rate and/or the pressure normalize again, the speed of rotation of the compressor 5 is increased again.

Performance of the method of the invention is made possible by a regulating device 18, which is not depicted in its entirety in the present figures.

The set value of the measuring device which acts on the second regulating valve 15 is somewhat higher, e.g. by 0.1 bar, than the set value of the measuring device which acts on the first regulating valve 11 or 13, in order to prevent oscillation of the regulation. For example, the set value of the measuring device which acts on the second regulating valve 15 can in this case be 3.1 bar, while the set value of the measuring device which acts on the first regulating valve 11 or 13 is 3.0 bar.

FIG. 1 also shows a third supply conduit 21 which makes it possible to supply treated barrier gas 6 and also pure barrier gas 7 to further consumers (not depicted).

The connections depicted as broken lines show the communication paths of the regulating device 18, with the apparatus of the invention also being able to comprise further measuring devices and regulating valves in addition to those described in order to carry out the method of the invention. A conduit depicted as a broken line running parallel to the second supply conduit 10 is optionally provided in order to introduce pure nitrogen into the third supply conduit 21.

Figure 2:
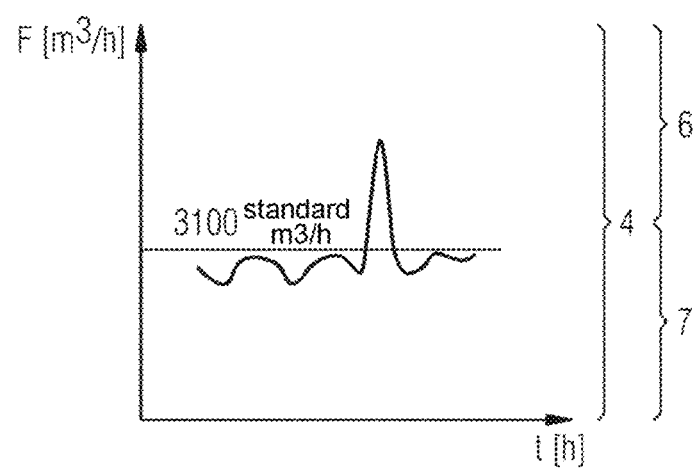
FIG. 2 a schematic depiction of normal consumption and also peak consumption of pure barrier gas for flushing the product discharge device FIG. 3 a schematic depiction of a further variant of the method of the invention.

FIG. 2 schematically depicts the peak consumption between the normal consumption of pure barrier gas 7 for flushing the product discharge device 2, with the flow rate F being plotted against the time t in the coordinate system. Straight lines running parallel to the x axis show the maximum capacity of the nitrogen generator 8, which in the present example is 3100 standard $m^3/h$. It can be seen from the graph that the amount of barrier gas 4 supplied in principle varies within the range below the maximum capacity of the nitrogen generator 8 and is consequently served only by the nitrogen generator 8, as a result of which the barrier gas 4 is pure barrier gas 7. If the consumption of barrier gas 4 rises, as depicted in FIG. 2 by the high peak, above the maximum capacity of the nitrogen generator 8, the barrier gas is no longer supplied only by the nitrogen generator 8 alone but instead additional treated barrier gas 8 from the compressor is supplied to the product discharge device 2, while the nitrogen compressor continues to supply pure barrier gas 7 at maximum capacity, but not above the latter.

FIG. 3 schematically shows a further variant of an apparatus according to the invention for carrying out a method according to the invention. The apparatus for sealing a reduction apparatus 1 comprises a reduction apparatus 3 having a product discharge device 2. To supply barrier gas 4, a first supply conduit 9 leads from a compressor 5 to the product discharge device 2. The metallized material goes from the product discharge device 2 into the product discharge chamber 19 and from there is passed to further processing or a further use. To supply pure barrier gas, a second supply conduit 10 leads from a nitrogen generator 8 to the first supply conduit 9.

The first supply conduit 9 comprises a third regulating valve 13 and also a first measuring device 14, the first regulating valve 11 of FIG. 1 is not present here. The second supply conduit comprises a second measuring device 17. Seen viewed in the direction of flow of the treated barrier gas 6, the second supply conduit 10 opens into the first supply conduit 9 downstream of the third regulating valve 13 but upstream of the first measuring device 14.

The apparatus further comprises a second regulating valve 15 and also a second measuring device 17 which measures the pressure or flow rate and controls it by means of the second regulating valve 15, with the second measuring device 17 and the second regulating valve being positioned in the second supply conduit 10.

In the present example, the nitrogen generator 8 has a maximum capacity of 3100 standard m$^3$/h. As long as the amount of pure barrier gas 7 supplied remains below the maximum capacity of the nitrogen generator 8, pure barrier gas 7 is conveyed from the nitrogen generator 8 via the second supply conduit 10 into the first supply conduit 9 and via the first supply conduit 9 further to the product discharge device 2 for use. In this case, the regulating valve 13 remains completely or largely closed and the product discharge device 2 is supplied only with pure barrier gas 7. However, if the demand for barrier gas 4 increases to above the maximum capacity, the third regulating valve 13 opens completely or partially, so that the product discharge device 2 is supplied not only with pure barrier gas 7 from the nitrogen generator 8 via the second supply conduit 10 but also with treated barrier gas 6 from the compressor 5 via the first supply conduit 9. As soon as the demand goes back into the region of the maximum capacity or below, the third regulating valve 13 closes again, either completely or partially. In the present example, the nitrogen generator 8 is a PSA plant, the function of which is based on a certain counterpressure to set the adsorption pressure.

Viewed in the flow direction of the pure barrier gas 7, the second supply conduit 10 has a pressure maintenance valve 23 arranged on the nitrogen generator 8 or close to the nitrogen generator 8. The pressure maintenance valve 23 keeps the pressure constant at a previously prescribed pressure, for example 7 bar, in order to prevent the nitrogen generator 8 from being damaged by the presence of a pressure which is too low.

The first measuring device 14 measures the pressure or the flow rate in the first supply conduit 9, as soon as a change or a decrease in the pressure or an increase in the flow rate, which is associated with the maximum capacity of the nitrogen generator 8 being exceeded, is registered, the third regulating valve 13 opens so that treated barrier gas 6 can be supplied from the compressor 5 via the first supply conduit 9 to the product discharge device 2. In this case, pure barrier gas 7 nevertheless continues to be supplied with the maximum capacity and then mixes with treated barrier gas 6 in the first supply conduit 9. In principle, treated barrier gas 6 is therefore never supplied alone to the product discharge device 2, although this would naturally also be possible. As soon as the demand goes back into the region of the maximum capacity or below, the third regulating valve 13 closes again, either completely or partially.

If the pressure in the first supply conduit 9 is now about 3 bar in times of normal consumption and the first measuring device 14 measures a pressure drop to, for example, 2.9 bar, the third regulating valve 13 is opened in order to be able to supply treated barrier gas 6 from the compressor 5 to the product discharge device 2. As soon as the demand goes back into the region of maximum capacity or below, the third regulating valve 13 closes again, either completely or partially.

The second measuring device 17 measures the flow rate in the second supply conduit 10. As soon as the second measuring device 17 determines an increase in the flow rate to above the maximum capacity of the nitrogen generator 8, the regulating valve 15 closes partially so that only pure barrier gas is supplied at maximum capacity, but not above, to the first supply conduit 9. As a result of the second regulating valve 15 not closing completely, the product discharge device 2 is never supplied entirely with treated barrier gas 6.

The compressor 5 has not only a downstream cooler but also a frequency converter 22, which regulates the power of the compressor, and a third measuring device 16 which measures the pressure and/or the flow rate. Depending on the amount of treated barrier gas 6 available, the frequency converter 22 regulates the speed of rotation of the compressor either downward or upward. If large amounts of treated barrier gas 6 are available at the compressor 5, the frequency converter 22 decreases the speed of rotation of the compressor 5. If small amounts of treated barrier gas 6 are available, the compressor 5 increases the speed of rotation of the compressor.

In the case of the compressor 5 no longer having any capacity for taking up further treated barrier gas 6 and the throttling of the power no longer having any effect, the third measuring device 16 detects an associated change or decrease in the pressure or an increase in the flow, so that the third regulating valve 13 opens in order to supply treated barrier gas 6 to the product discharge device 2. In this case, too, the treated barrier gas 6 is mixed with the pure barrier gas 7 in the first supply conduit 9, so that in principle no treated barrier gas 6 is ever supplied alone to the product discharge device 2.

The apparatus further comprises a second regulating valve 15 and also a second measuring device 17 which measures the pressure or the flow rate and controls it by means of the second regulating valve 15, with the second measuring device 17 and the second regulating valve being located in the second supply conduit 10.

LIST OF REFERENCE NUMERALS

1 Apparatus for sealing a reduction apparatus
2 Product discharge device
3 Reduction apparatus
4 Barrier gas
5 Compressor
6 Treated barrier gas
7 Pure barrier gas
8 Nitrogen generator
9 First supply conduit
10 Second supply conduit
11 First regulating valve
12 Bypass conduit
13 Third regulating valve
14 First measuring device
15 Second regulating valve
16 Third measuring device
17 Second measuring device
18 Regulating device
19 Product discharge chamber 20 Fourth regulating valve
21 Third supply conduit
22 Frequency converter
23 Pressure maintenance valve

The invention claimed is:

1. A method for sealing a reduction apparatus, the reduction apparatus comprising a product discharge device, the method comprising:
   supplying the product discharge device with a barrier gas;
   providing at least one compressor for supplying treated barrier gas to the product discharge device; and
   providing at least one nitrogen generator for producing pure barrier gas;
   wherein when a barrier gas requirement of the product discharge device rises above a maximum capacity of the at least one nitrogen generator, the treated barrier gas from the at least one compressor is added to the pure barrier gas stream, and a mixture barrier gas formed by the two gases is supplied to the product discharge device.

2. The method for sealing the reduction apparatus as claimed in claim 1, wherein the pure barrier gas consists of technical-grade nitrogen or of a nitrogen/argon mixture.

3. The method for sealing the reduction apparatus as claimed in claim 1, wherein the treated barrier gas from the at least one compressor comprises carbon dioxide, water vapor, nitrogen, and residual oxygen.

4. The method for sealing the reduction apparatus as claimed in claim 1, wherein the reduction apparatus is a direct reduction plant for a direct reduction of metal oxide-containing starting materials to metallized material by contact with a hot reduction gas.

5. The method for sealing the reduction apparatus as claimed in claim 1, wherein the metal oxide-containing starting materials are iron oxide-containing starting materials.

6. A method for sealing a reduction apparatus, the reduction apparatus comprising a product discharge device, the method comprising:
   supplying the product discharge device with a barrier gas;
   providing at least one compressor for supplying treated barrier gas to the product discharge device;
   providing at least one nitrogen generator for producing pure barrier gas; and
   providing:
      a first supply conduit to the product discharge device comprising a first regulating valve; and
      a second supply conduit to the first supply conduit comprising a second regulating valve and a measuring device;
   wherein the barrier gas for supply to the product discharge device is composed of one of:
      a pure barrier gas from the at least one nitrogen generator; and
      the pure barrier gas from the at least one nitrogen generator and a treated barrier gas from the at least one compressor; and
   wherein a pressure is measured in at least one of the first supply conduit and the second supply conduit and when a barrier gas requirement of the product discharge device rises above a maximum capacity of the at least one nitrogen generator, the first regulating valve in the first supply conduit is opened in order to supply additional treated barrier gas from the at least one compressor to the product discharge device.

7. The method for sealing the reduction apparatus as claimed in claim 6, wherein the measuring device comprises at least one of a first measuring device in the first supply conduit and a second measuring device in the second supply conduit.

8. The method for sealing the reduction apparatus as claimed in claim 6, wherein:
   the at least one compressor comprises a bypass conduit and a third measuring device, and the first regulating valve of the first supply conduit opens when the third measuring device determines that a large part of the treated barrier gas downstream of the at least one compressor is being recirculated via the bypass conduit to the suction side of the at least one compressor; and
   at least one of:
      the third measuring device is adapted to measure the pressure or a flow rate; and
      the large part of the treated barrier gas is the entire treated barrier gas.

9. A method for sealing a reduction apparatus, the reduction apparatus comprising a product discharge device, the method comprising:
   supplying the product discharge device with a barrier gas;
   providing at least one compressor for supplying treated barrier gas to the product discharge device;
   providing at least one nitrogen generator for producing pure barrier gas; and
   providing:
      a first supply conduit to the product discharge device comprising a first regulating valve; and
      a second supply conduit to the first supply conduit comprising a second regulating valve and a measuring device;
   wherein the barrier gas for supply to the product discharge device is composed of one of:
      a pure barrier gas from the at least one nitrogen generator; and
      the pure barrier gas from the at least one nitrogen generator and a treated barrier gas from the at least one compressor; and
   wherein the flow rate is measured in at least one of the first supply conduit and the second supply conduit and when a barrier gas requirement of the product discharge device rises above a maximum capacity of the at least one nitrogen generator, the first regulating valve in the first supply conduit is opened in order to supply additional treated barrier gas from the at least one compressor to the product discharge device.

10. The method for sealing the reduction apparatus as claimed in claim 9, wherein the measuring device comprises at least one of a first measuring device in the first supply conduit and a second measuring device in the second supply conduit.

11. The method for sealing the reduction apparatus as claimed in claim 9, wherein the at least one compressor comprises a bypass conduit and a third measuring device, and the first regulating valve of the first supply conduit opens when the third measuring device determines that a large part of the treated barrier gas downstream of the at least one compressor is being recirculated via the bypass conduit to the suction side of the at least one compressor.

12. The method for sealing the reduction apparatus as claimed in claim 11, wherein:
   the at least one nitrogen generator comprises a second regulating valve; and
   the second regulating valve continues to keep the amount of pure barrier gas constant at the maximum capacity of the at least one nitrogen generator when the first regulating valve in the first supply conduit is opened.

13. An apparatus for sealing a reduction apparatus, the reduction apparatus comprising a product discharge device, comprising:
- at least one compressor for supplying treated barrier gas to the product discharge device via a first supply conduit, the first supply conduit to the product discharge device comprising a first regulating valve;
- at least one nitrogen generator for producing pure barrier gas, the at least one nitrogen generator comprising a second supply conduit to the first supply conduit, the second supply conduit for supplying barrier gas to the product discharge device; and
- a regulating device configured to regulate a first regulating valve of the first supply conduit and a second regulating valve of the second supply conduit so that when a barrier gas requirement of the product discharge device rises above a maximum capacity of the at least one nitrogen generator, the treated barrier gas from the at least one compressor is added to the pure barrier gas stream, and a mixture barrier gas formed by the two gases is supplied to the product discharge device.

14. The apparatus for sealing the reduction apparatus as claimed in claim 13, further comprsing:
- at least one measuring device for measuring a pressure;
- wherein the regulating device is configured so that when a barrier gas requirement of the product discharge device rises above a maximum capacity of the at least one nitrogen generator, the first regulating valve in the first supply conduit opens in order to supply additional treated barrier gas from the at least one compressor to the product discharge device.

15. The apparatus for sealing the reduction apparatus as claimed in claim 14, wherein the measuring device comprises at least one of a first measuring device in the first supply conduit and a second measuring device in the second supply conduit.

16. The apparatus for sealing the reduction apparatus as claimed in claim 13, further comprsing:
- at least one measuring device for measuring a flow rate;
- wherein the regulating device is configured so that when a barrier gas requirement of the product discharge device rises above a maximum capacity of the at least one nitrogen generator, the first regulating valve in the first supply conduit opens in order to supply additional treated barrier gas from the at least one compressor to the product discharge device.

17. The apparatus for sealing the reduction apparatus as claimed in claim 16, wherein the measuring device comprises at least one of a first measuring device in the first supply conduit and a second measuring device in the second supply conduit.

18. The apparatus for sealing the reduction apparatus as claimed in claim 13, wherein:
- the at least one compressor comprises a bypass conduit and a third measuring device; and
- the regulating device is configured so that the first regulating valve of the first supply conduit opens when the third measuring device determines that a large part of the treated barrier gas downstream of the at least one compressor is being recirculated via the bypass conduit to the suction side of the at least one compressor.

19. The apparatus for sealing the reduction apparatus as claimed in claim 18, wherein at least one of:
- the third measuring device is adapted to measure the pressure or the flow rate; and
- the large part of the treated barrier gas is the entire treated barrier gas.

20. The apparatus for sealing the reduction apparatus as claimed in claim 13, wherein:
- the at least one nitrogen generator comprises a second regulating valve; and
- the regulating device is configured so that the second regulating valve continues to keep the amount of pure barrier gas supplied constant at a maximum capacity of the at least one nitrogen generator when the first regulating valve in the first supply conduit is opened.

21. The apparatus for sealing the reduction apparatus as claimed in claim 14, wherein the at least one nitrogen generator further comprises a second measuring device for measuring pressure, where the regulating device is configured so that the amount of pure barrier gas supplied from the at least one nitrogen generator is limited to a preset maximum capacity when the first or second measuring device detects a decrease in at least one of the pressure and an increase in the flow rate.

22. The apparatus for sealing the reduction apparatus as claimed in claim 13, wherein the reduction apparatus is a direct reduction plant for a direct reduction of metal oxide-containing starting materials to metallized material by contact with a hot reduction gas.

23. The apparatus for sealing the reduction apparatus as claimed in claim 22, wherein the metal oxide-containing starting materials are iron oxide-containing starting materials.

* * * * *